US008586645B2

(12) United States Patent
Khandal et al.

(10) Patent No.: US 8,586,645 B2
(45) Date of Patent: Nov. 19, 2013

(54) LEAD CONTAINING NOVEL POLYACRYLATE FOR OPTICAL APPLICATIONS

(75) Inventors: Rakesh Kumar Khandal, Delhi (IN); Amita Malik, Delhi (IN); Geetha Seshadri, Delhi (IN); Mukti Tyagi, Delhi (IN)

(73) Assignee: Shriram Institute for Industrial Research, Delhi (IN)

( * ) Notice: Subject to any disclaimer, the term of this patent is extended or adjusted under 35 U.S.C. 154(b) by 445 days.

(21) Appl. No.: 12/303,636

(22) PCT Filed: Mar. 9, 2007

(86) PCT No.: PCT/IN2007/000096
§ 371 (c)(1),
(2), (4) Date: Feb. 24, 2009

(87) PCT Pub. No.: WO2007/141801
PCT Pub. Date: Dec. 13, 2007

(65) Prior Publication Data
US 2010/0029805 A1    Feb. 4, 2010

(30) Foreign Application Priority Data

Jun. 5, 2006    (IN) .......................... 1342/DEL/2006

(51) Int. Cl.
*C08F 2/50*    (2006.01)
*B29B 11/00*    (2006.01)

(52) U.S. Cl.
USPC ................ 522/178; 522/71; 522/81; 522/182

(58) Field of Classification Search
USPC ..................................... 522/71, 81, 178, 182
See application file for complete search history.

(56) References Cited

U.S. PATENT DOCUMENTS 4,585,841 A    4/1986 Eguchi et al.

*Primary Examiner* — Sanza McClendon
(74) *Attorney, Agent, or Firm* — The Webb Law Firm

(57) ABSTRACT

A process for the preparation of lead containing polyacrylates for optical applications. The process consists in dispersing lead monoxide in acrylic acid to form a monomer mixture. An aromatic carboxylic acid is added to the monomer mixture and then a cross linking agent is added thereto. Such a monomer mixture is subjected to the step of polymerization by gamma radiation.

8 Claims, No Drawings

LEAD CONTAINING NOVEL POLYACRYLATE FOR OPTICAL APPLICATIONS

FIELD OF INVENTION

This invention relates to a process for the preparation of polymeric materials for use in ophthalmic applications such as polarized lenses, light waveguides, optical fibres and as varnish composition for coating films.

PRIOR ART

Plastic lenses have become popular in recent years for use in optical elements such as lenses. Resins which are widely used for the production of plastic lenses are diethylene glycol bisallyl carbonate (1.50) and polyacrylates (1.45). Lenses prepared from them have a low refractive index than glass lenses (nd=1.52). In order to obtain equivalent properties to glass lenses, it is necessary to increase the center thickness, peripheral thickness, and the curvature of the lens as a result of which the lens becomes very thick.

Still other disadvantages are poor hardness and low impact strength.

OBJECT OF THE INVENTION

An object of this invention is to propose a process for the preparation of polymeric materials for use in optical lenses and coatings.

Another object of this invention is to propose a process for the preparation of polymeric materials for use in optical lenses and coatings which has a higher refractive index in comparison to that of the known art.

A still another object of this invention is to propose a process for the preparation of polymeric materials for use in optical lenses and coatings which has a comparatively higher hardness.

Yet another object of this invention is to propose a process for the preparation of polymeric materials for use in optical lenses and coatings which has a higher impact strength in comparison to the known art.

A further object of this invention is to propose a process for the preparation of polymeric materials for use in optical lenses and coatings which is efficient.

Further object and advantages of this invention will be more apparent from the ensuing description.

DESCRIPTION OF INVENTION

According to this invention there is provided a process for the preparation of plastic material for use in optical lenses and coatings comprising in the steps of:
a) dispersing lead monoxide in acrylic to form a monomer mixture;
b) adding an aromatic carboxylic acid selected from phenyl acetic acid or cinnamic acid to such a mixture;
c) adding a cross linking such as styrene to the mixture of step c, and
d) and subjecting the mixture of step (c) to the step of polymerization by gamma radiation.

In accordance with this invention the process comprises in dispersing 19% to 21% by weight of lead monoxide in acrylic acid. It has been found that if more than 21% by weight of lead monoxide is added to acrylic acid, then the mixture is no longer homogenous as some the metal salt precipitates out. The mixture is stirred under a temperature of 25 to 30° C. to obtain a homogenous mixture.

Such a monomer mixture has a refractive index of 1.473 upon 21% by weight of addition of lead monoxide and 1.442 upon addition of 19% by weight of addition of metal salt in comparison to a refractive index of 1.420 of acrylic acid.

To such a mixture, an aromatic carboxylic acid is added to increase the refractive index. The aromatic carboxylic acid is selected from phenyl acetic acid or cinnamic acid. It has been found that cinanmic acid imparts a certain colour to the plastic material. Thus, in the instance where colour is not desired, phenyl acetic acid is used for the lens and cinnamic acid for the coating. It has been found that the presence of metal ions, is responsible for an increase in the impact strength. The presence of metal ions such as lead ion only marginally increases the refractive index.

As described hereinabove, lead monoxide is added first and stirred to form a homogenous mixture. However, if the aromatic carboxylic acid is added first followed by addition of metal ions, then the dispersability decreases.

The aromatic carboxylic acid is also added under stirring conditions and at ambient temperature Phenyl acetic acid is added in an amount of 11% to 13% by weight and cinnamic acid in an amount of 9% to 11% by weight. If more than 13% by weight of phenyl acetic acid or 11% by weight of cinnamic acid is added to the mixture, there is no increase in the refractive index. However, if less than 11% by weight of phenyl acetic acid or 9% by weight of cinnamic acid is added to the mixture, then there is a reduction in the refractive index.

A cross linking agent such a styrene is finally added to the mixture and in an amount of 0.3 to 0.4 moles. Styrene also assists in improving the cross link between the monomer units. Such a mixture is subjected to the step of polymerization by gamma radiation in the presence of cobalt 60 as source. In the instance, where lenses is required, the mixture is subjected to the step of cast polymerization. The dose employed is 0.8 to 1.2 megarads.

Further objects and advantages of this invention will be more apparent from the ensuing examples, which are not intended to impart any restriction on the scope of the invention.

Example 1

5 gms of mixture containing lead monoxide dispersed in acrylic acid and phenyl acetic acid was added to 3.12 gms of styrene. Such a mixture was injected into glass moulds and subjected to gamma radiation in the presence of cobalt 60 at a dose of 1.2 megarads. The polymerized lens had the following properties:

| | |
|---|---|
| Refractive index | 1.595 |
| Transmittance | >90% |
| Shore D-hardness | 85 |
| Abbey no | 36 |
| Impact strength | Passes FDA standards |

Example 2

Example 1 was repeated except that cinnamic acid was used instead of phenyl acetic acid. The gamma radiation was carried out at a dosage of 1.2 megarads. The polymerized material had a colour and which was used as a coating.

It is to be noted that the present invention is susceptible to modifications, adaptations and changes by those skilled in the art. Such variant embodiments employing the concepts and features of this invention are intended to be within the scope of the present invention, which is further set forth under the following claims.

We claim:

1. A process for the preparation of plastic material for use in optical lenses and coatings comprising in the steps of:
    a) dispersing lead monoxide in acrylic acid to form a mixture;
    b) adding an aromatic carboxylic acid selected from phenyl acetic acid or cinnamic acid to such a mixture;
    c) adding a cross linking agent such as styrene to the mixture of step (b), and
    d) subjecting the mixture of step (c) to the step of polymerization by gamma radiation,
    wherein said lead monoxide is added to acrylic acid under stirring conditions and at ambient temperature.

2. A process as claimed in claim 1 wherein 19 to 21% by weight of lead monoxide is added to acrylic acid.

3. A process as claimed in claim 1 wherein 11 to 13% by weight of phenyl acetic acid or 9 to 11% by weight of cinnamic acid is added to the mixture of acrylic acid and metal salt.

4. A process as claimed in claim 3 wherein said phenyl acetic acid or cinnamic acid is added to the said mixture and stirred.

5. A process as claimed in claim 1 wherein the dose of radiation is 0.8 to 1.2 megarads.

6. A process as claimed in claim 1 wherein 11 to 13% by weight of phenyl acetic acid is added to the mixture of acrylic acid and metal salt.

7. A process as claimed in claim 1 wherein 9 to 11% by weight of cinnamic acid is added to the mixture of acrylic acid and metal salt.

8. A process for the preparation of plastic material for use in optical lenses and coatings comprising in the steps of:
    a) dispersing lead monoxide in acrylic acid to form a mixture, wherein lead oxide is added in an amount of 19 to 21% by weight;
    b) adding an aromatic carboxylic acid selected from phenyl acetic acid or cinnamic acid to such a mixture, wherein 11% to 13% by weight of phenyl acetic acid or 9 to 11% by weight of cinnamic acid is added to the mixture;
    c) adding a cross linking agent such as styrene to the mixture of step (b), and
    d) subjecting the mixture of step (c) to the step of polymerization by gamma radiation,
    wherein said lead monoxide is added to acrylic acid under stirring conditions and at ambient temperature.

* * * * *

UNITED STATES PATENT AND TRADEMARK OFFICE
CERTIFICATE OF CORRECTION

PATENT NO. : 8,586,645 B2  Page 1 of 1
APPLICATION NO. : 12/303636
DATED : November 19, 2013
INVENTOR(S) : Khandal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 643 days.

Signed and Sealed this
Twenty-second Day of September, 2015

Michelle K. Lee
*Director of the United States Patent and Trademark Office*